(12) United States Patent
Maggiore

(10) Patent No.: US 10,914,549 B1
(45) Date of Patent: Feb. 9, 2021

(54) CELL PHONE MOUNT FOR BUG KILLING GUNS

(71) Applicant: Lorenzo Maggiore, Santa Monica, CA (US)

(72) Inventor: Lorenzo Maggiore, Santa Monica, CA (US)

( * ) Notice: Subject to any disclaimer, the term of this patent is extended or adjusted under 35 U.S.C. 154(b) by 0 days.

(21) Appl. No.: 17/073,101

(22) Filed: Oct. 16, 2020

Related U.S. Application Data

(63) Continuation of application No. PCT/US2020/040021, filed on Jun. 27, 2020.

(51) Int. Cl.
| | |
|---|---|
| *F41C 27/00* | (2006.01) |
| *F16M 11/20* | (2006.01) |
| *F16M 11/04* | (2006.01) |
| *G03B 17/56* | (2006.01) |
| *F41G 11/00* | (2006.01) |
| *F16M 11/24* | (2006.01) |

(52) U.S. Cl.
CPC ......... *F41C 27/00* (2013.01); *F16M 11/2014* (2013.01); *F16M 11/04* (2013.01); *F16M 11/24* (2013.01); *F41G 11/00* (2013.01); *G03B 17/56* (2013.01)

(58) Field of Classification Search
CPC ..... F41C 27/00; F16M 11/2014; F16M 11/24; F16M 11/04; F41G 11/00; G03B 17/56
See application file for complete search history.

(56) References Cited

U.S. PATENT DOCUMENTS

| | | | |
|---|---|---|---|
| 4,512,726 A | | 4/1985 | Strimling |
| 5,787,630 A | * | 8/1998 | Martel ................... F41G 11/003 |
| | | | 42/125 |
| D676,923 S | * | 2/2013 | Maggiore .................... D22/122 |
| 8,545,091 B1 | | 10/2013 | Arribau |
| 8,578,647 B2 | * | 11/2013 | Storch ...................... F41C 27/00 |
| | | | 42/124 |
| 8,793,917 B2 | * | 8/2014 | Russell ................... F41C 27/00 |
| | | | 42/90 |
| 8,819,983 B2 | * | 9/2014 | Tate ..................... F16M 11/041 |
| | | | 42/90 |
| 8,911,162 B2 | * | 12/2014 | Kuehl ................ F16M 11/2085 |
| | | | 396/428 |
| 8,971,959 B2 | * | 3/2015 | Hunt .................... F16M 11/041 |
| | | | 455/557 |
| 9,080,839 B2 | * | 7/2015 | Arachequesne ......... F41G 1/387 |
| 9,151,571 B2 | * | 10/2015 | Russell .................. G03B 29/00 |

(Continued)

*Primary Examiner* — Michelle Clement
(74) *Attorney, Agent, or Firm* — David A. Belasco; Belasco Jacobs & Townsley, LLP

(57) ABSTRACT

A cell phone mount for bug killing guns includes a cell phone clamping portion and a bug gun rail attaching portion. The clamping portion has retaining jaws urged together to hold edges of a cell phone. The attaching portion has a base, a cover, attaching claws and a cam lock. The attaching claws move laterally and vertically to attach to a top rail of the gun. The cam lock has a rotating portion with a vertical shaft, is rotatably mounted to the base and engages the attaching claws. The cam lock has a lever with attached rotary cam. The cam is mounted to the vertical shaft and bears on the cover. When the lever is rotated, the attaching claws move laterally and when the lever is moved vertically, the rotary cam move the attaching claws vertically, attaching the cell phone mount to the top rail of the bug killing gun.

6 Claims, 10 Drawing Sheets

(56) References Cited

U.S. PATENT DOCUMENTS

| | | | |
|---|---|---|---|
| 9,432,071 B2* | 8/2016 | An | F16M 13/022 |
| 10,006,742 B1* | 6/2018 | Campbell | F41G 1/38 |
| 10,036,614 B1* | 7/2018 | Ruiz | F41C 27/00 |
| 10,408,565 B2* | 9/2019 | Albrecht | F41C 27/00 |
| 10,690,449 B2* | 6/2020 | Cosentino | F41G 11/003 |
| 10,754,240 B2* | 8/2020 | Peel | F41G 11/001 |
| 10,837,739 B2* | 11/2020 | Ramirez | F41G 11/003 |
| 2008/0216380 A1* | 9/2008 | Teetzel | F41G 11/003 42/127 |
| 2011/0076095 A1* | 3/2011 | Storch | F41G 11/003 403/322.4 |
| 2011/0220088 A1 | 9/2011 | Maggiore | |
| 2012/0151815 A1* | 6/2012 | Tate | F41B 5/1492 42/90 |
| 2012/0240444 A1* | 9/2012 | Russell | F41G 3/165 42/90 |
| 2013/0185985 A1* | 7/2013 | Ballard | F41G 11/003 42/148 |
| 2013/0251358 A1* | 9/2013 | Kuehl | F41G 11/001 396/428 |
| 2014/0097306 A1* | 4/2014 | Hale | F16M 11/041 248/122.1 |
| 2014/0317987 A1* | 10/2014 | Kuehl | F41C 27/00 42/90 |
| 2014/0360077 A1 | 12/2014 | Miller | |
| 2014/0360078 A1* | 12/2014 | Arachequesne | F41G 11/006 42/90 |
| 2014/0367535 A1* | 12/2014 | Rost | F16M 13/00 248/122.1 |
| 2016/0325693 A1* | 11/2016 | Kim | F16M 11/041 |
| 2016/0377383 A1* | 12/2016 | Downing | F41G 11/003 42/111 |
| 2017/0010073 A1* | 1/2017 | Downing | F41G 3/165 |
| 2017/0049251 A1* | 2/2017 | Gulick, Jr. | F16M 11/041 |
| 2017/0142301 A1* | 5/2017 | Simmon | F41G 11/00 |
| 2017/0227322 A1* | 8/2017 | Franklin | F16M 11/041 |
| 2017/0261286 A1* | 9/2017 | Galloway | F41J 5/10 |
| 2018/0164662 A1* | 6/2018 | Olmos-Calderon | G03B 17/566 |
| 2018/0304823 A1* | 10/2018 | Yu | F16M 11/041 |
| 2018/0335271 A1 | 11/2018 | Maggiore | |
| 2019/0052740 A1* | 2/2019 | Ormsbee | H04M 1/04 |
| 2019/0118972 A1* | 4/2019 | Yan | F16M 11/12 |
| 2019/0263326 A1* | 8/2019 | Yu | F16M 13/00 |
| 2019/0283685 A1* | 9/2019 | Zhang | F16M 11/04 |
| 2019/0301833 A1* | 10/2019 | Campbell | G03B 29/00 |
| 2019/0390692 A1* | 12/2019 | Li | F16B 2/12 |
| 2020/0015585 A1* | 1/2020 | Ren | F16M 11/24 |
| 2020/0120194 A1* | 4/2020 | Ahmed | F16M 11/121 |
| 2020/0192197 A1* | 6/2020 | Li | F16B 2/12 |
| 2020/0272044 A1* | 8/2020 | Walker | G03B 29/00 |
| 2020/0378415 A1* | 12/2020 | Dammermann | F16B 2/185 |

* cited by examiner

CELL PHONE MOUNT FOR BUG KILLING GUNS

PRIOR APPLICATION

The instant application is a continuation of International Application No. PCT/US20/40021, filed Jun. 27, 2020 and currently pending and incorporating by reference the disclosure of this application in its entirety.

FIELD OF INVENTION

This invention relates to cell phone mounting devices, and more specifically to a cell phone mount for the sighting rib of a bug killing gun.

BACKGROUND OF THE INVENTION

An exciting new sport/hobby has developed around the toy guns designed to shoot salt particles at flies, mosquitoes and other insects. As with many sports and hobbies, enthusiasts are fond of recording their play photographically. The modern cellular telephone makes this practical by providing a high quality video camera that can focus and adjust lighting automatically with a minimum of user input. Users of the readily available bug killing guns are interested in creating videos that capture their hunting and killing of insect pests. As two hands are usually required to accurately shoot the bug killing gun at a small, potentially moving target, holding the cell phone to record the incident becomes problematic. Various devices have been developed to attach a cell phone to a weapon. The following are some examples of the available devices.

U.S. Pat. No. 10,006,742 issued to Campbell patent is directed to a sight adjustable rotating smartphone mount for firearms, through which shooter can view an enlarged target area on the smartphone screen and record the target area from either side of the firearm, standing perpendicular to the firearm rail and barrel. This is done through use of a mirror reflecting the view down the barrel which is reflected into the camera of the cell phone, allowing the user to view the image forward without being in line with the gun barrel.

U.S. Pat. No. 9,151,571 issued to Russell is directed to an apparatus for mounting a smartphone onto a firearm for capturing images and recordings of a firearm target. The camera equipped smartphone mount apparatus includes an adapter connected to a scope of the firearm, a sleeve connected the adapter, and a base member in the form of a platform for receiving a camera.

U.S. Pat. No. 8,819,983 issued to Tate is directed to a mounting apparatus for attachment to a hunting weapon and supports a recording device. A flexible arm of the phone mount is connected to a hunting device by screwing in the connector screw and the flexible arm remains in place, providing a rigid support for the camera phone and camera phone holder.

U.S. Pat. No. 8,971,959 issued to Hunt et al. is directed to a mounting system for attaching a camera equipped mobile device to a gun or any other sports equipment for video or image capturing purposes. A mounting system is used for attaching mobile device to the sports equipment (gun, archery, etc.).

U.S. Pat. No. 10,408,565 issued to Albrecht is directed to an apparatus for mounting accessories on a rifle and includes a base that is mountable on a rifle for taking pictures and video during shooting. The accessory mounting apparatus includes a base, and an accessory mounting bracket comprising an accessory mounting leg and a depth positioning leg for enabling a user to mount an accessory such as a camera on a rifle.

U.S. Pat. No. 9,080,839 issued to Arachequesne is directed to a mounting arrangement of a miniature camera or mobile phone with photographic functions on the telescopic sight of a gun to capture photos or videos while shooting the gun. A tapped hole formed in the mobile phone is mounted onto a threaded pin which projects from the top of the gunsight.

While some of these devices have desirable features, many have problems making them less useful. The present invention addresses these problems by providing a mask of novel design incorporating a number of innovative features.

It is an objective of the present invention to provide a secure cell phone mount that can be rigidly attached to presently available bug killing guns. It is a further objective to provide a mount that will accommodate a wide variety of popular cell phones. It is a still further objective of the invention to provide a mount that allows use of the original bug killing gun sights without interference. It is yet a further objective to provide a mount that is quickly and easily attached to and removed from the bug killing gun. Another objective is to provide a mount that is durable, easy to clean and of pleasing appearance. Finally, it is an objective of the present invention to provide a cell phone mount that is easily and economically producible in large quantities.

While some of the objectives of the present invention are disclosed in the prior art, none of the inventions found include all of the requirements identified.

SUMMARY OF THE INVENTION

The present invention addresses all of the deficiencies of prior art cell phone mounting inventions and satisfies all of the objectives described above.

(1) A cell phone mount for bug killing guns can be constructed from the following components. A cell phone clamping portion and a bug gun rail attaching portion are provided. The cell phone clamping portion is mounted to the bug gun rail attaching portion. The cell phone clamping portion has first and second retaining jaws. The first and second retaining jaws are sized and shaped to hold first and second side edges of a cell phone and are urged together to provide a first clamping action.

The bug gun rail attaching portion has a base, a cover, first and second attaching claws and a positioning cam lock. The first and second attaching claws are movable laterally and vertically from the base to provide a second clamping action. The second clamping action attaches the base to a top rail of a bug killing gun. The bug gun rail attaching portion provides a sighting opening. The sighting opening is located above the top rail and allows continued use of the sights of the bug killing gun. The positioning cam lock has a rotating portion and a locking portion. The rotating portion has an extended vertical shaft, is rotatably mounted to the base and engages the first and second attaching claws to move them laterally and vertically. The locking portion comprising a lever with attached rotary cam.

The cover has a central aperture and is attached over the rotating portion of the positioning cam lock with the extended vertical shaft extended through the central aperture. The rotary cam is pivotally mounted to the extended vertical shaft and bears on the cover adjacent the central aperture. When the lever is rotated, the first and second attaching claws will move laterally with respect to the base and when the lever is moved vertically, the rotary cam will move the first and second attaching claws vertically. The rotary cam secures the first and second attaching claws in a fixed position by urging the first and second attaching claws upwardly against an underside of the top rail and bearing downwardly on an upper surface of the cover, thereby attaching the cell phone mount to the bug killing gun.

(2) In a variant of the invention, the cell phone clamping portion further includes at least one compression spring, at least one spring retaining channel, a clamping portion bottom and a clamping portion cover. The clamping portion bottom has at least one spring compressing block and at least one spring compression channel. The at least one compression spring is sized and shaped to fit within the at least one spring retaining channel. The at least one spring retaining channel is orthogonally attached to the first retaining jaw. The at least one spring compressing block is sized and shaped to fit slidably within the at least one spring retaining channel and to bear against an upper end of the at least one compression spring. The at least one spring retaining channel is sized and shaped to fit slidably within the at least one spring compression channel.

The clamping portion cover is orthogonally attached to the second retaining jaw and is removably attached to the clamping portion bottom. The clamping portion bottom secures the at least one compression spring within the at least one spring retaining channel, and the at least one spring retaining channel within the at least one spring compression channel. When the first retaining jaw is pulled away from the second retaining jaw, a space is created for entry of the cell phone and when the first retaining jaw is released, the first retaining jaw the second retaining jaw will clamp the cell phone.

(3) In another variant, the cell phone clamping portion further includes first and second friction pads. The first and second friction pads are attached to inner gripping surfaces of the first and second retaining jaws. The first and second friction pads have textured outer surfaces and first and second retaining ridges.

(4) In still another variant, the cell phone clamping portion attaches to the cover of the bug gun rail attaching portion at a downward angle.

(5) In yet another variant, the bug gun rail attaching portion further includes at least one first side gripping ledge. The at least one first side gripping ledge extends inwardly from an inner side of the first attaching claw. At least one second side gripping ledge is provided. The at least one second side gripping ledge extends inwardly from an inner side of the second attaching claw. First and second guide pins are provided. The first and second guide pins extend vertically from the first and second attaching claws. First and second blocking ledges are provided. The first and second blocking ledges extend outwardly from outer sides of the first and second attaching claws. First and second attaching claw slots are provided. The first and second attaching claw slots are located adjacent first and second side edges of the base and are sized and shaped to permit upward movement of the first and second attaching claws as far as the first and second blocking ledges.

A raised central bearing ring is provided. The raised central bearing ring is located on an upper surface of the base. The rotating portion of the positioning cam lock has a guide wheel located at a lower end. The guide wheel has a circular recess located on an underside of the guide wheel. The circular recess is sized and shaped to fit slidably over the raised central bearing ring. The guide wheel is penetrated by first and second curved slots. The curved slots are sized and shaped to engage the first and second guide pins. The engagement causes the first and second attaching claws to move laterally as the rotating portion is rotated. The guide wheel has first and second elevating ridges. The first and second elevating ridges are located along an outer perimeter of the guide wheel adjacent the first and second curved slots.

A sighting cylinder is provided. The sighting cylinder is located upon an upper surface of the guide wheel and has a closed upper end. A circular bearing ring is located upon the closed upper end. The extended vertical shaft extends above the circular bearing ring. The sighting cylinder has anterior and posterior aligned openings. The anterior and posterior aligned openings permit use of sights of the bug killing gun through the sighting cylinder when the extended vertical shaft is rotated to a locking position. The cover has a circular bearing surface. The circular bearing surface protrudes below the central aperture and slidably engages the circular bearing ring of the rotating portion of the positioning cam lock. The cover has anterior and posterior sighting openings located in anterior and posterior ends of the cover. The anterior and posterior sighting openings are aligned with the anterior and posterior aligned openings in the sighting cylinder when the extended vertical shaft is rotated to a locking position.

The cover has a countersunk circular bearing surface on the upper surface of the cover. A cam activating block is provided. The cam activating block has a protruding circular ring located upon a lower surface. The protruding circular ring rotatably engages the countersunk circular bearing surface. An enlarged clearance hole extends through the protruding circular ring and a V-shaped notch is located above the enlarged clearance hole. The V-shaped notch provides a pivoting surface for a bearing pin. The bearing pin pivotally mounts the rotary cam of the locking portion of the positioning cam lock to a point adjacent an upper end of the extended vertical shaft of the rotating portion.

(6) In a final variant, first and second first side vertical guide tabs are provided. The first and second first side vertical guide tabs are located adjacent front and rear ends of the first side edge of the base. First and second second side vertical guide tabs are provided. The first and second second side vertical guide tabs are located adjacent front and rear ends of the second side edge of the base.

First and second first side vertical guide blocks are provided. The first and second first side vertical guide blocks have an inner horizontal channel, are sized and shaped to fit slidably over the first and second first side vertical guide tabs, and have a vertical guide rail located on an inner surface. First and second second side vertical guide blocks are provided. The first and second second side vertical guide blocks have an inner horizontal channel, are sized and shaped to fit slidably over the first and second second side vertical guide tabs, and have a vertical guide rail located on an inner surface.

First and second side retaining covers are provided. The first and second side retaining covers have first and second central curved interior ledges. The first and second central curved interior ledges are sized and shaped to engage the first and second elevating ridges of the guide wheel. The first and second side retaining covers are attached to upper edges of the first and second attaching claws, thereby causing the first and second attaching claws to move vertically as the extended vertical shaft, sighting cylinder and guide wheel are moved vertically.

The first and second side retaining covers have first and second guide posts, first and second first side guide slots and first and second second side guide slots. The cover has first and second first side guide rails and first and second second side guide rails. The first and second guide posts are sized and shaped to fit slidably between the first and second first side guide rails and first and second second side guide rails, respectively. The first and second first side guide slots and first and second second side guide slots are sized and shaped to fit slidably about the first and second first side guide rails and first and second second side guide rails, respectively.

The first and second side retaining covers have anterior and posterior guide notches located at anterior and posterior guide ends of the first and second side retaining covers. The anterior and posterior guide notches of the first side retaining cover are sized and shaped to engage the vertical guide rails of the first and second first side vertical guide blocks. The vertical guide rails of the first and second first side vertical guide blocks are sized and shaped to engage anterior and posterior ends of the first side attaching claw. The anterior and posterior guide notches of the second side retaining cover are sized and shaped to engage the vertical guide rails of the first and second second side vertical guide blocks. The vertical guide rails of the first and second second side vertical guide blocks are sized and shaped to engage anterior and posterior ends of the second side attaching claw.

When the bug gun rail attaching portion is positioned on the bug gun top rail and the rotating portion of the positioning cam lock is rotated with the lever, the first and second attaching jaws will move laterally to fit beneath an underside of the bug gun rail. When the rotary cam is activated with the lever, the rotary cam will be biased against the cam activating block, drawing the extended vertical shaft, the sighting cylinder and the guide wheel upwardly, biasing the first and second elevating ridges against the first and second central curved interior ledges of the first and second side retaining covers, the first and second side retaining covers drawing the first and second attaching claws upwardly to clamp the bug gun rail attaching portion to the bug gun top rail.

DRAWING DESCRIPTIONS

DETAILED DESCRIPTION

The present invention addresses all of the deficiencies of prior art cell phone mounting inventions and satisfies all of the objectives described above.

Figure 1:
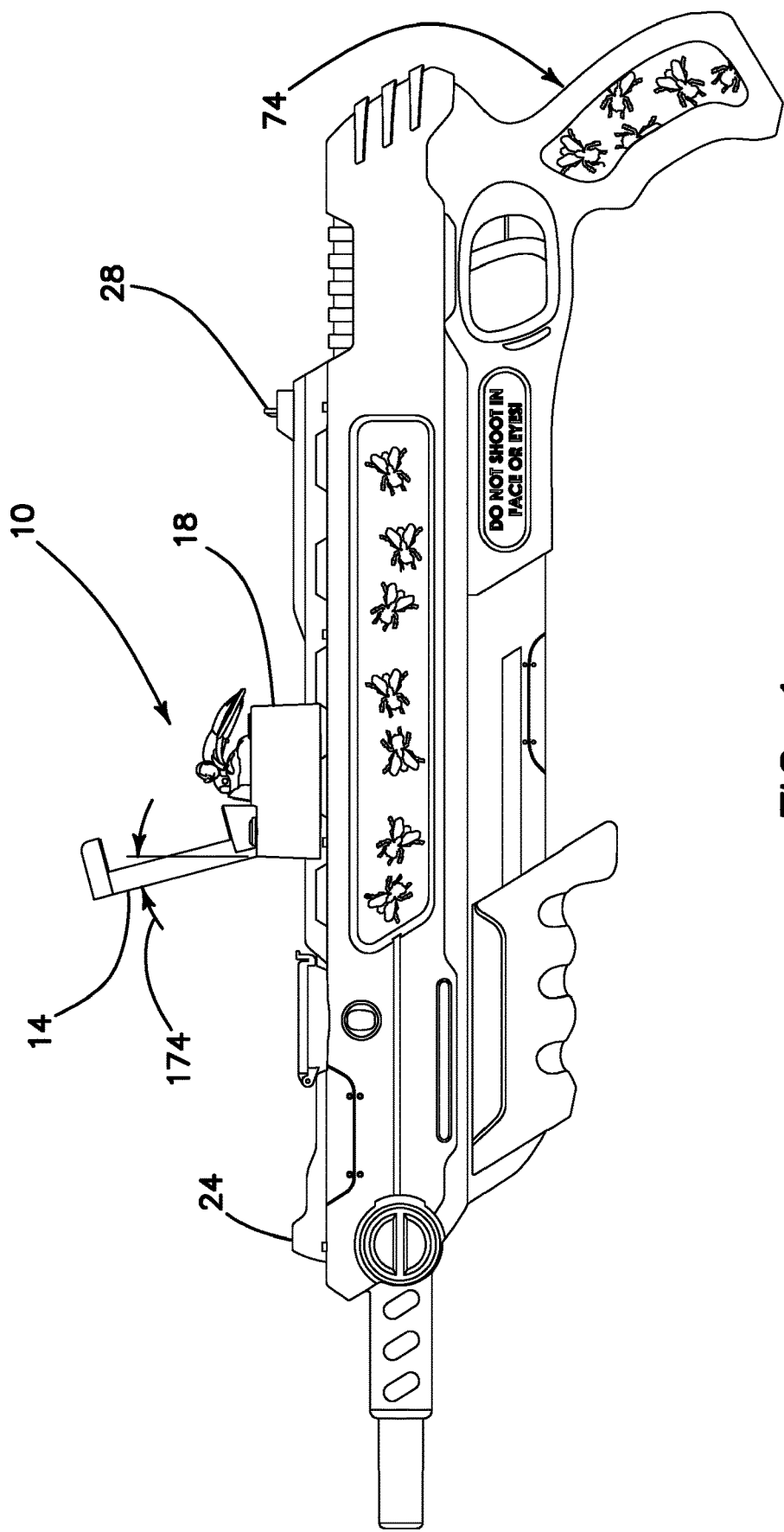
FIG. 1 is a side elevational view of the preferred embodiment of the invention attached to a bug killing gun.
Figure 2:
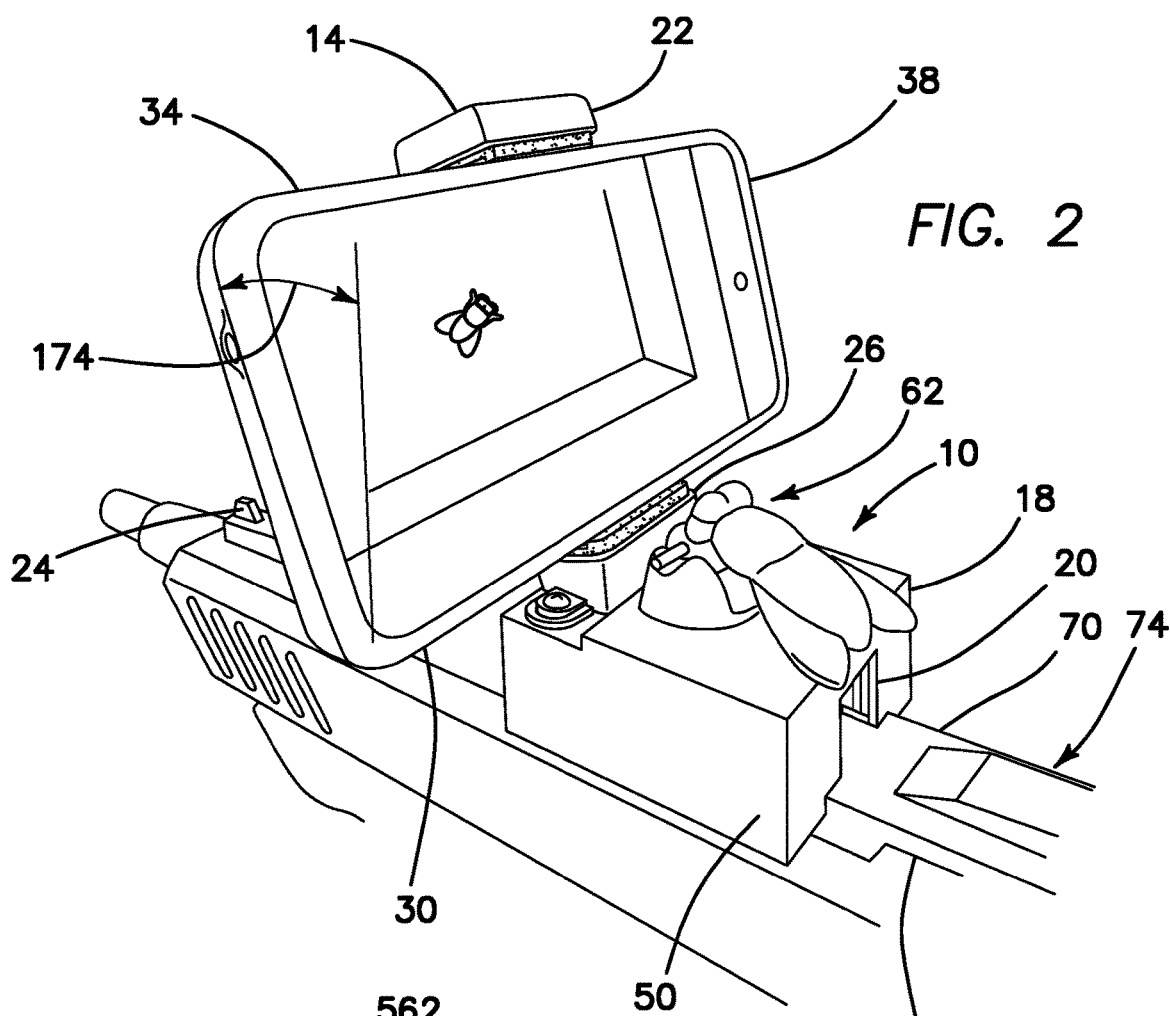
FIG. 2 is a perspective view of the FIG. 1 embodiment with a cell phone attached.
Figure 10:
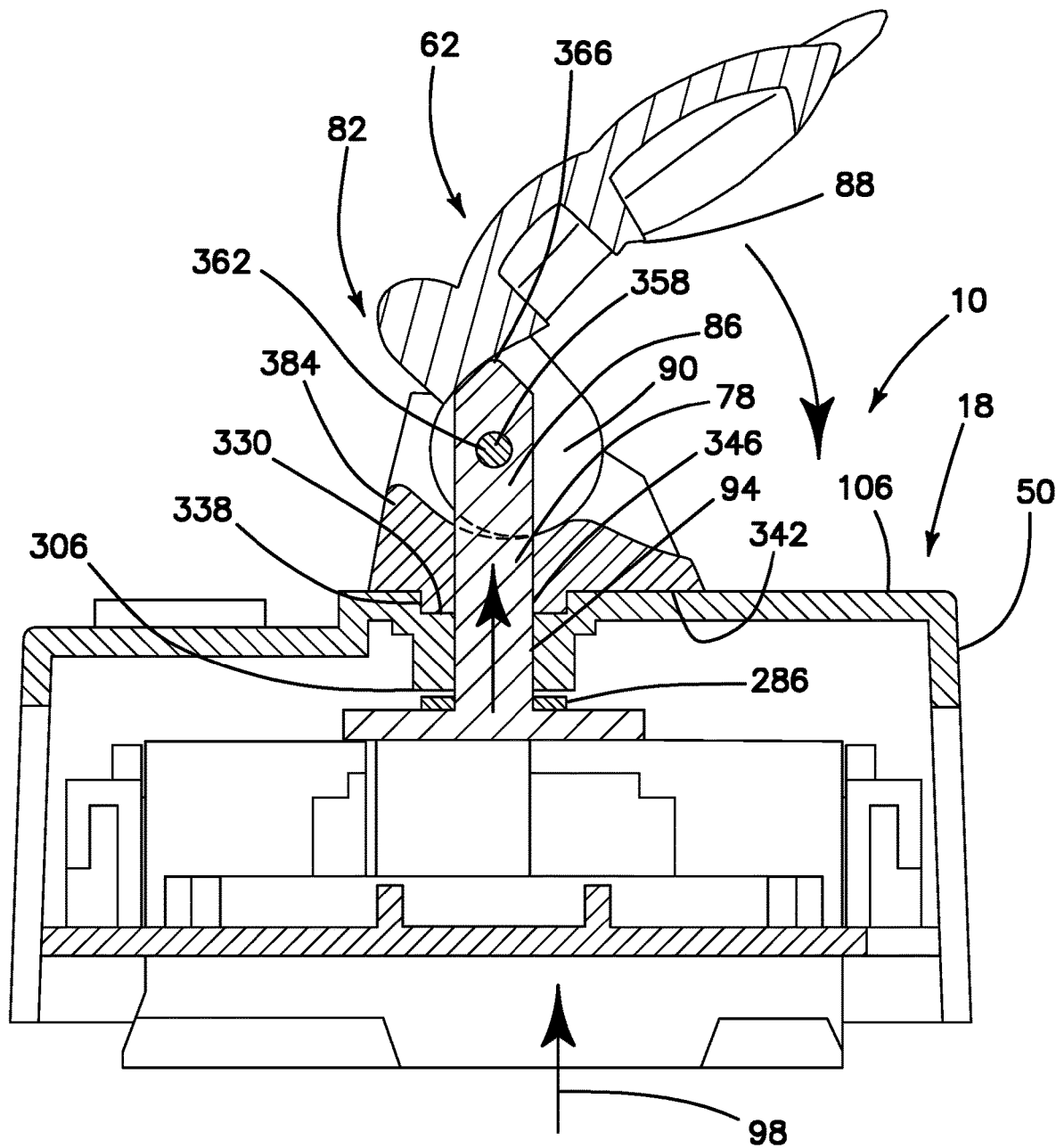
FIG. 10 is a side cross-sectional view of the bug gun rail attaching portion illustrating the vertical locking function of the positioning cam lock and movement of the attaching claws.
Figure 11:
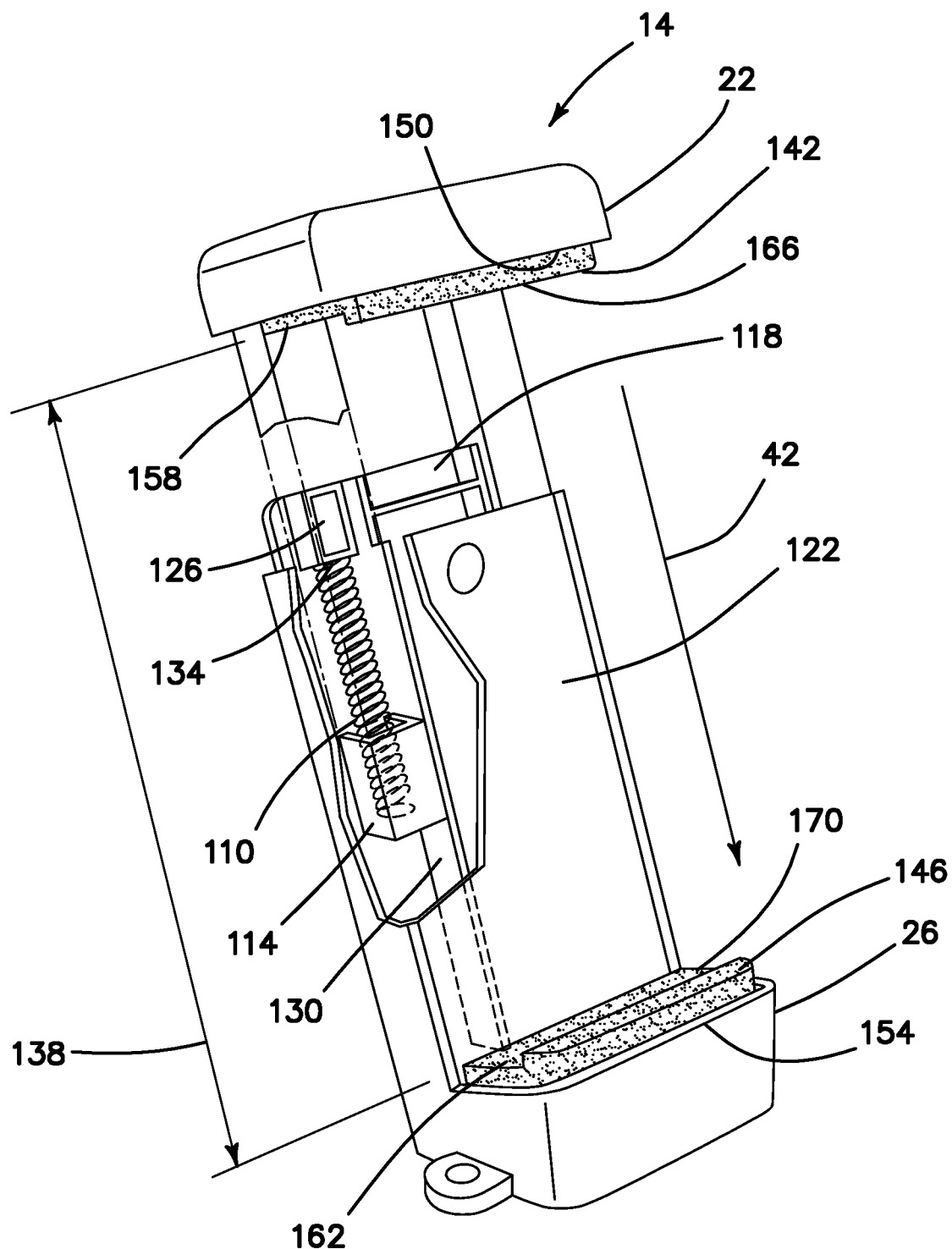
FIG. 11 is a partially broken out perspective view of the cell phone clamping portion.

(1) As illustrated in FIGS. 1-11, a cell phone mount for bug killing guns 10 may be constructed from the following components. A cell phone clamping portion 14 and a bug gun rail attaching portion 18 are provided. The cell phone clamping portion 14 is mounted to the bug gun rail attaching portion 18. As illustrated in FIGS. 2 and 11, the cell phone clamping portion 14 has first 22 and second 26 retaining jaws. The first 22 and second 26 retaining jaws are sized and shaped to hold first 30 and second 34 side edges of a cell phone 38 and are urged together to provide a first clamping action 42.

As illustrated in FIGS. 1-6, the bug gun rail attaching portion 18 has a base 46, a cover 50, first 54 and second 58 attaching claws and a positioning cam lock 62. The first 54 and second 58 attaching claws are movable laterally and vertically from the base 46 to provide a second clamping action 66. The second clamping action 66 attaches the base 46 to a top rail 70 of a bug killing gun 74. The bug gun rail attaching portion 18 provides a sighting opening 20. The sighting opening 20 is located above the top rail 70 and allows continued use of the sights 24, 28 of the bug killing gun 74. The positioning cam lock 62 has a rotating portion 78 and a locking portion 82. The rotating portion 78 has an extended vertical shaft 86, is rotatably mounted to the base 46 and engages the first 54 and second 58 attaching claws to move them laterally and vertically. The locking portion 82 comprising a lever 88 with attached rotary cam 90.

As illustrated in FIG. 10, the cover 50 has a central aperture 94 and is attached over the rotating portion 78 of the positioning cam lock 62 with the extended vertical shaft 86 extended through the central aperture 94. The rotary cam 90 is pivotally mounted to the extended vertical shaft 86 and bears on the cover 50 adjacent the central aperture 94. When the lever 88 is rotated, the first 54 and second 58 attaching claws will move laterally with respect to the base 46 and when the lever 88 is moved vertically, the rotary cam 90 will move the first 54 and second 58 attaching claws vertically. The rotary cam 90 secures the first 54 and second 58 attaching claws in a fixed position 98 by urging the first 54 and second 58 attaching claws upwardly against an underside 102 of the top rail 70 and bearing downwardly on an upper surface 106 of the cover 50, thereby attaching the cell phone mount 10 to the bug killing gun 74.

(2) In a variant of the invention, as illustrated in FIGS. 2 and 11, the cell phone clamping portion 14 further includes at least one compression spring 110, at least one spring retaining channel 114, a clamping portion bottom 118 and a clamping portion cover 122. The clamping portion bottom 118 has at least one spring compressing block 126 and at least one spring compression channel 130. The at least one compression spring 110 is sized and shaped to fit within the at least one spring retaining channel 114. The at least one spring retaining channel 114 is orthogonally attached to the first retaining jaw 22. The at least one spring compressing block 126 is sized and shaped to fit slidably within the at least one spring retaining channel 114 and to bear against an upper end 134 of the at least one compression spring 110. The at least one spring retaining channel 114 is sized and shaped to fit slidably within the at least one spring compression channel 130.

The clamping portion cover 122 is orthogonally attached to the second retaining jaw 26 and is removably attached to the clamping portion bottom 118. The clamping portion bottom 118 secures the at least one compression spring 110 within the at least one spring retaining channel 114, and the at least one spring retaining channel 114 within the at least one spring compression channel 130. When the first retaining jaw 22 is pulled away from the second retaining jaw 26, a space 138 is created for entry of the cell phone 38 and when the first retaining jaw 22 is released, the first retaining jaw 22 the second retaining jaw 26 will clamp the cell phone 38.

(3) In another variant, the cell phone clamping portion 14 further includes first 142 and second 146 friction pads. The first 142 and second 146 friction pads are attached to inner gripping surfaces 150, 154 of the first 22 and second 26 retaining jaws. The first 142 and second 146 friction pads have textured outer surfaces 158, 162 and first 166 and second 170 retaining ridges.

(4) In still another variant, as illustrated in FIGS. 1 and 2, the cell phone clamping portion 14 attaches to the cover 50 of the bug gun rail attaching portion 18 at a downward angle 174.

Figure 3:
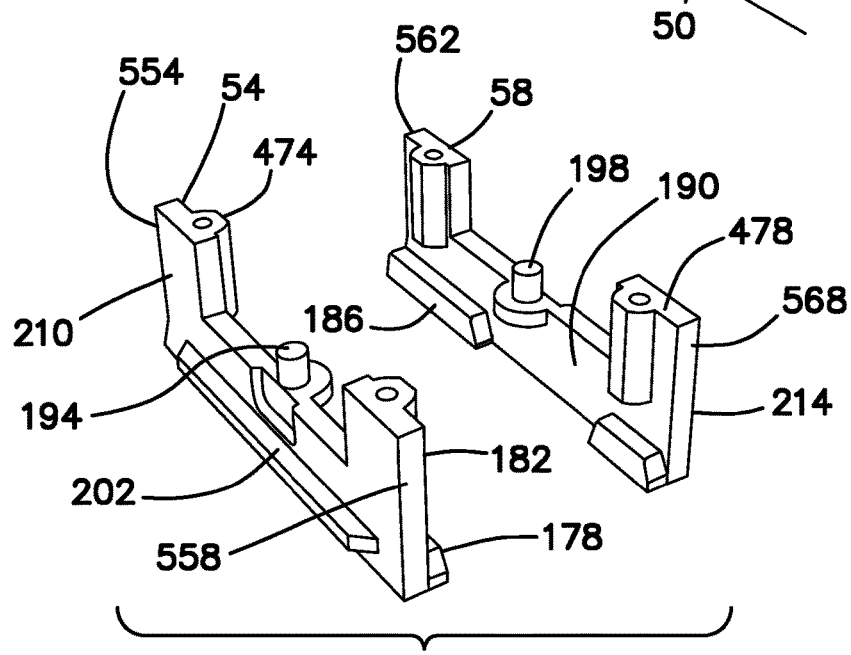
FIG. 3 is a perspective view of the first and second attaching claws.
Figure 4:
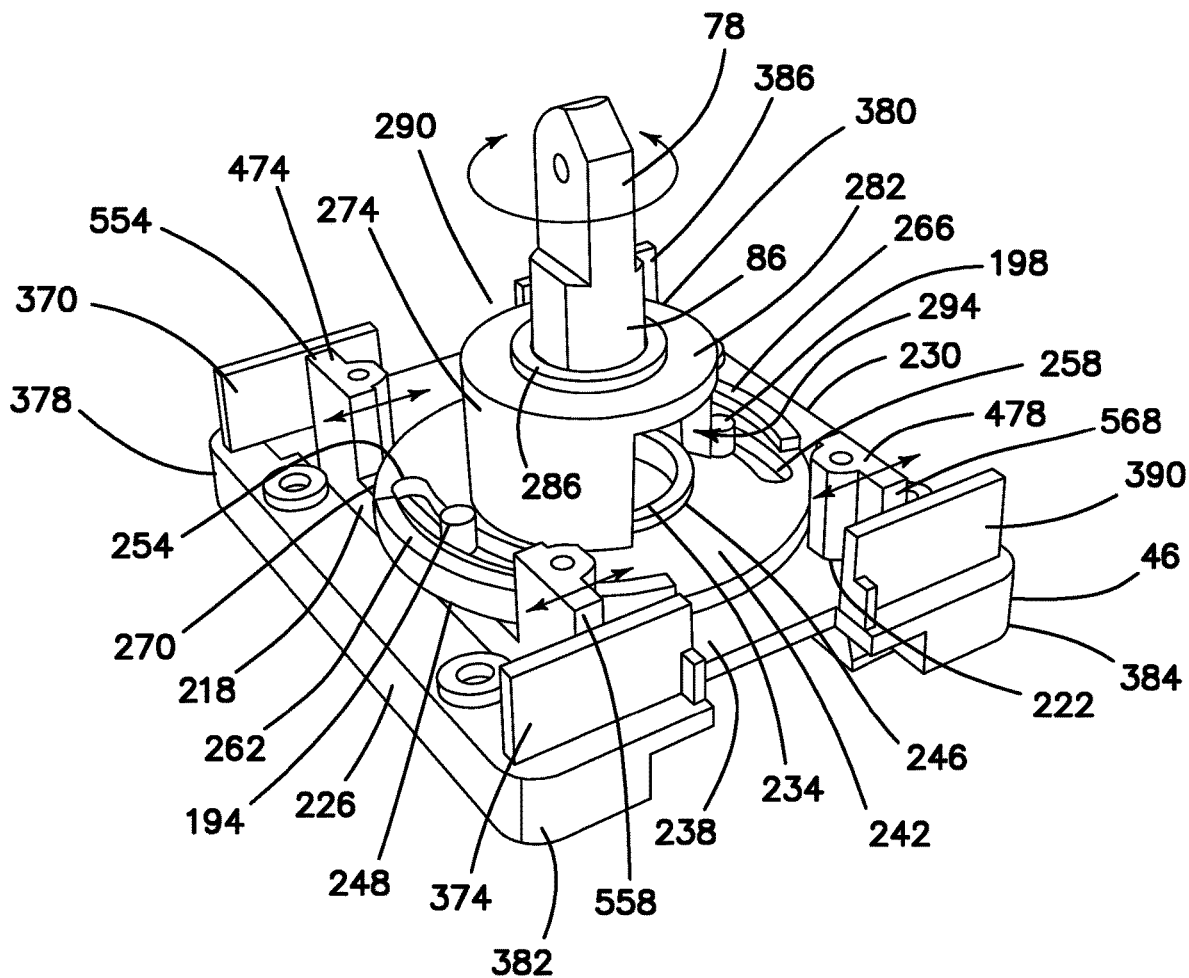
FIG. 4 is a perspective view of the base of the bug gun rail attaching portion illustrating the rotating portion of the positioning cam lock and the guide wheel engaging the attaching claws and an underside perspective view of the cover illustrating the first and second second side guide rails.
Figure 5:
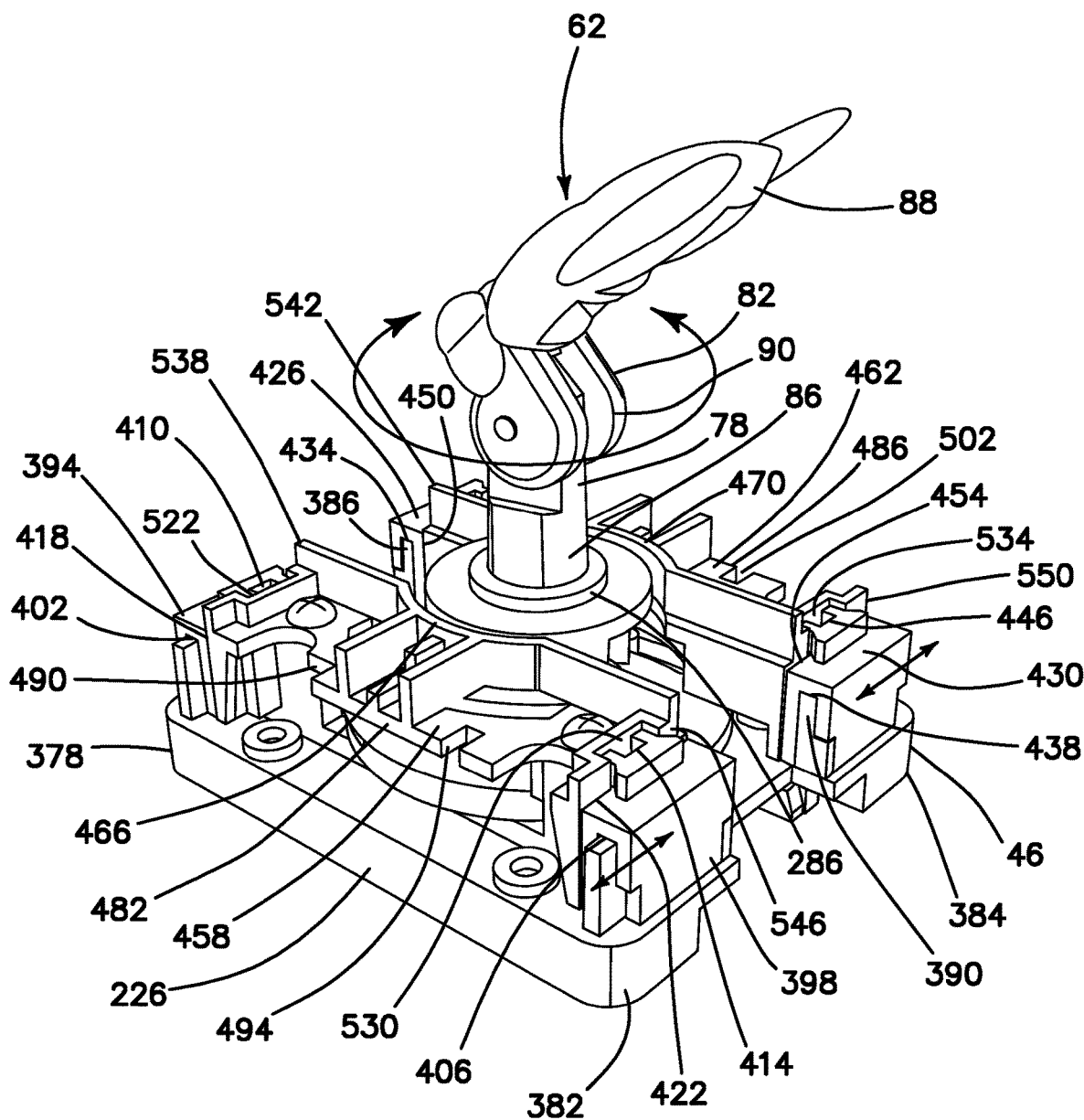
FIG. 5 is a perspective view of the base with the side retaining covers and guide blocks and lever of the locking portion of the rotary cam in place.
Figure 5A:
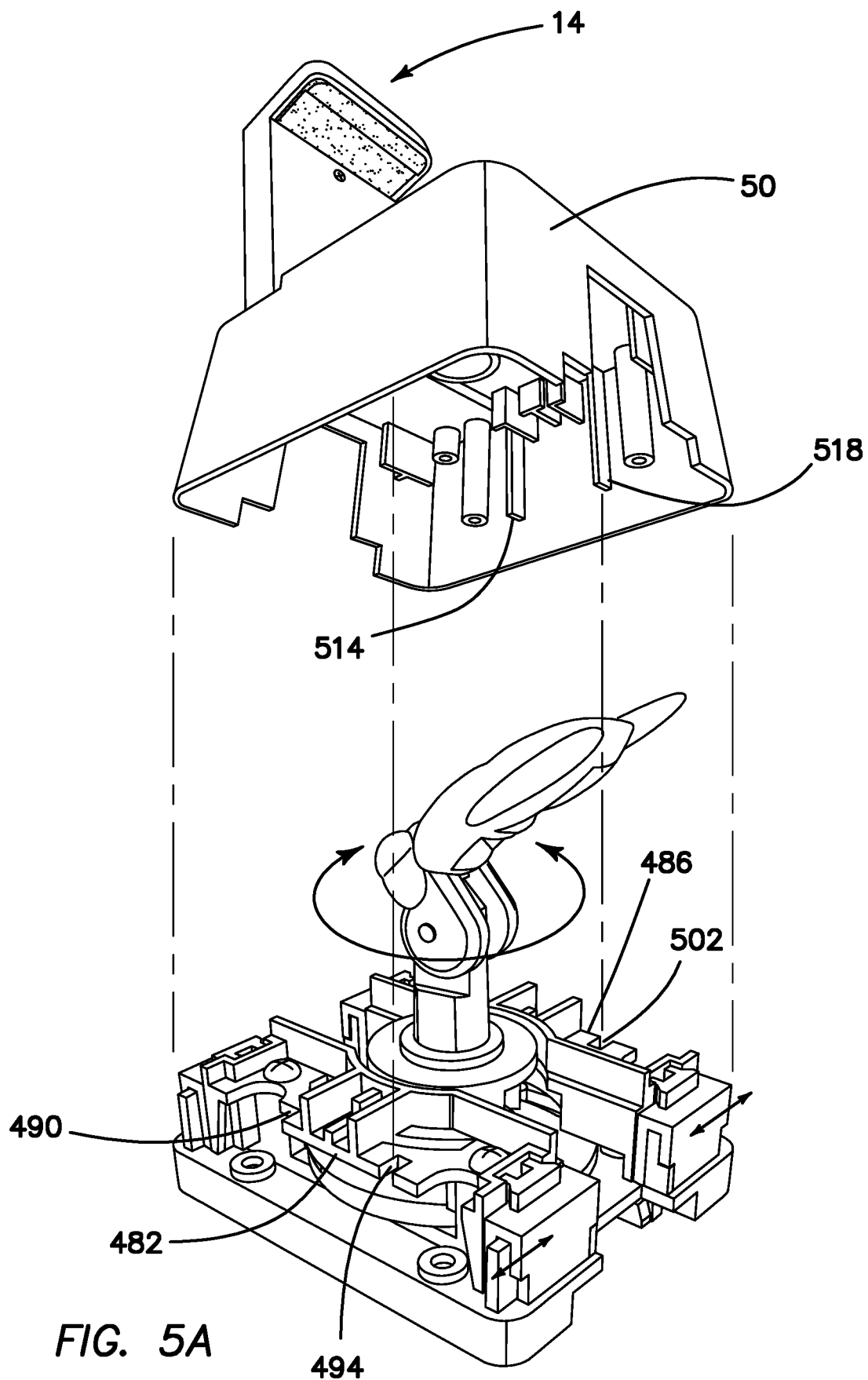
FIG. 5A is an exploded, perspective view of the bug gun rail attaching portion including the cover, illustrating the posts and notches of the side covers and the rails of the cover.
Figure 6:
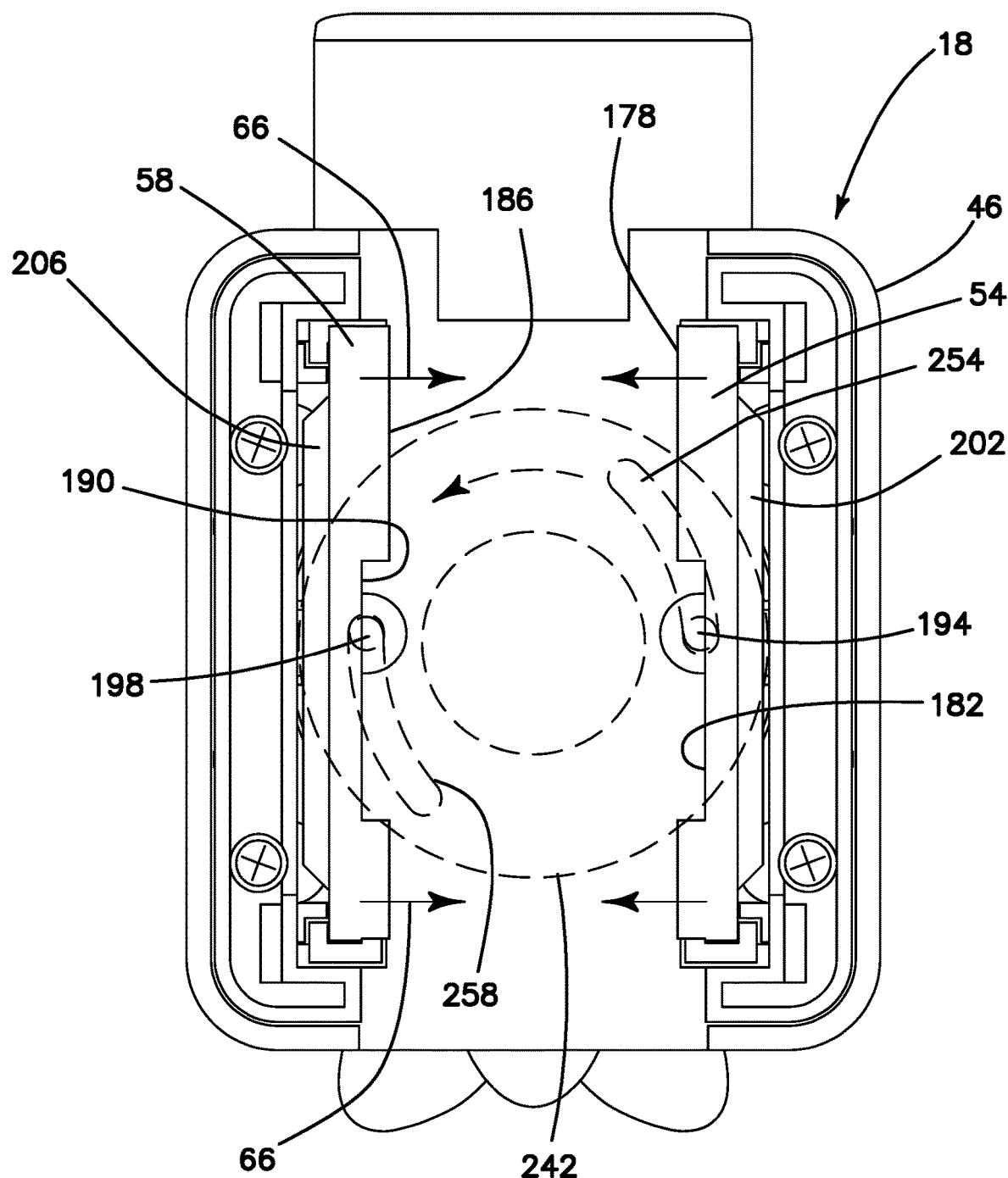
FIG. 6 is an upward plan view of the bug gun rail attaching portion illustrating the movement of the guide wheel and attaching claws.
Figure 7:
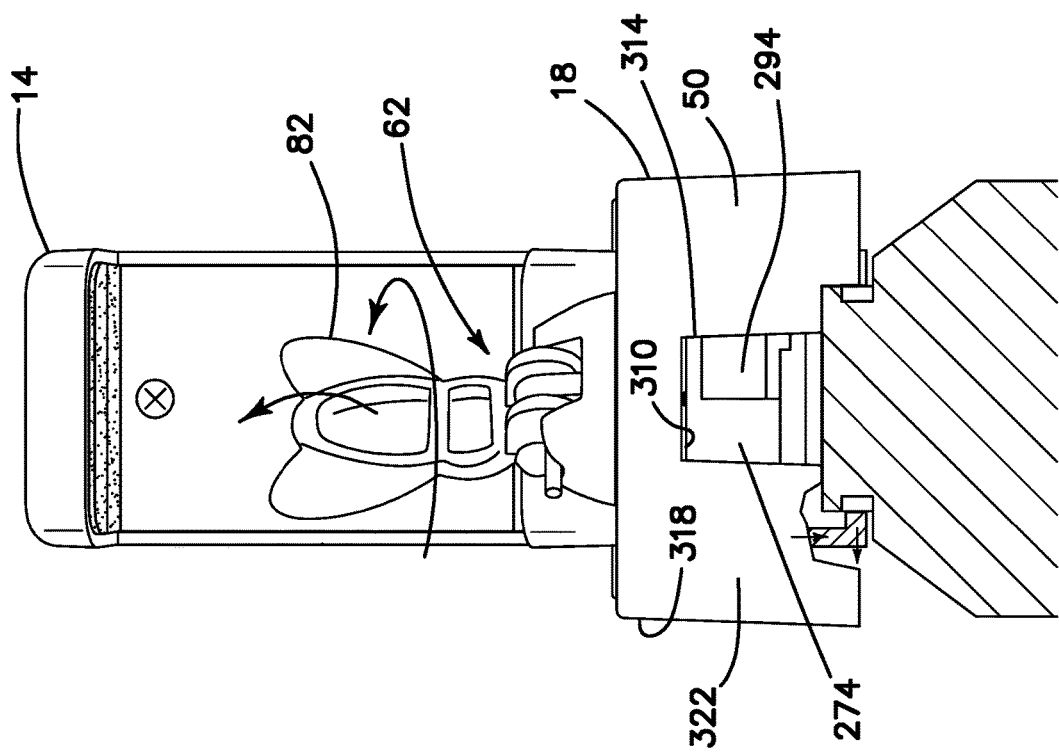
FIG. 7 is a rear view of the FIG. 1 embodiment locked to the bug gun rail and openings in the cover and sighting cylinder aligned.
Figure 8:
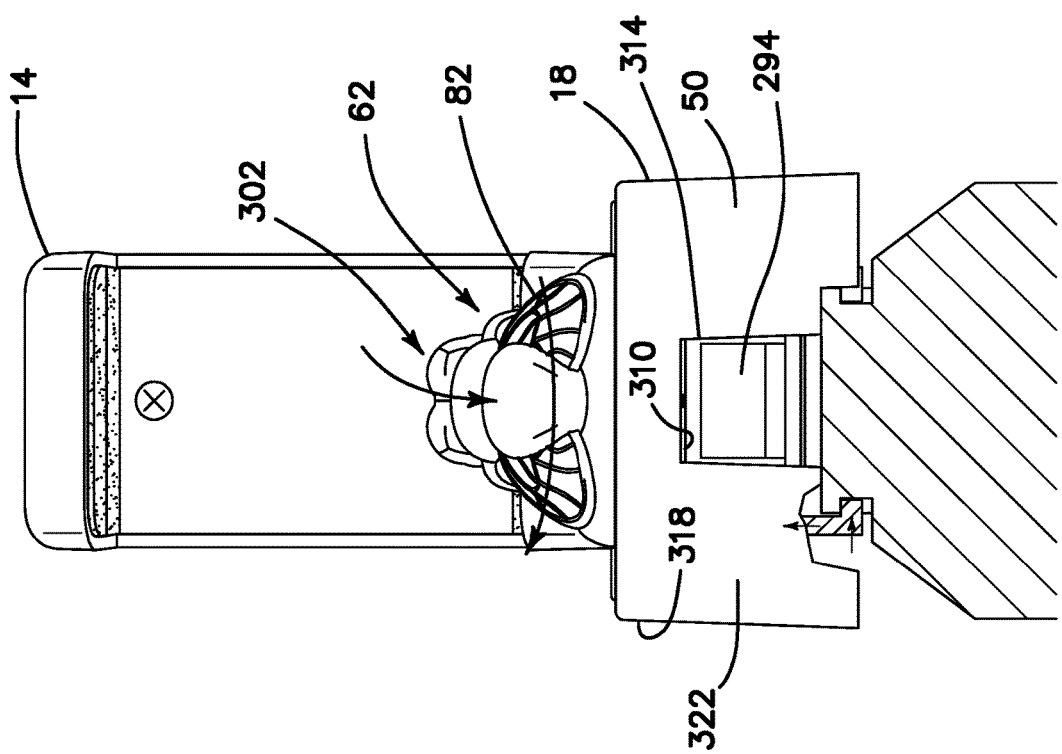
FIG. 8 is a rear view of the FIG. 1 embodiment with the attaching claws disengaged from the bug gun rail and the openings in the cover and sighting cylinder not aligned.
Figure 9:
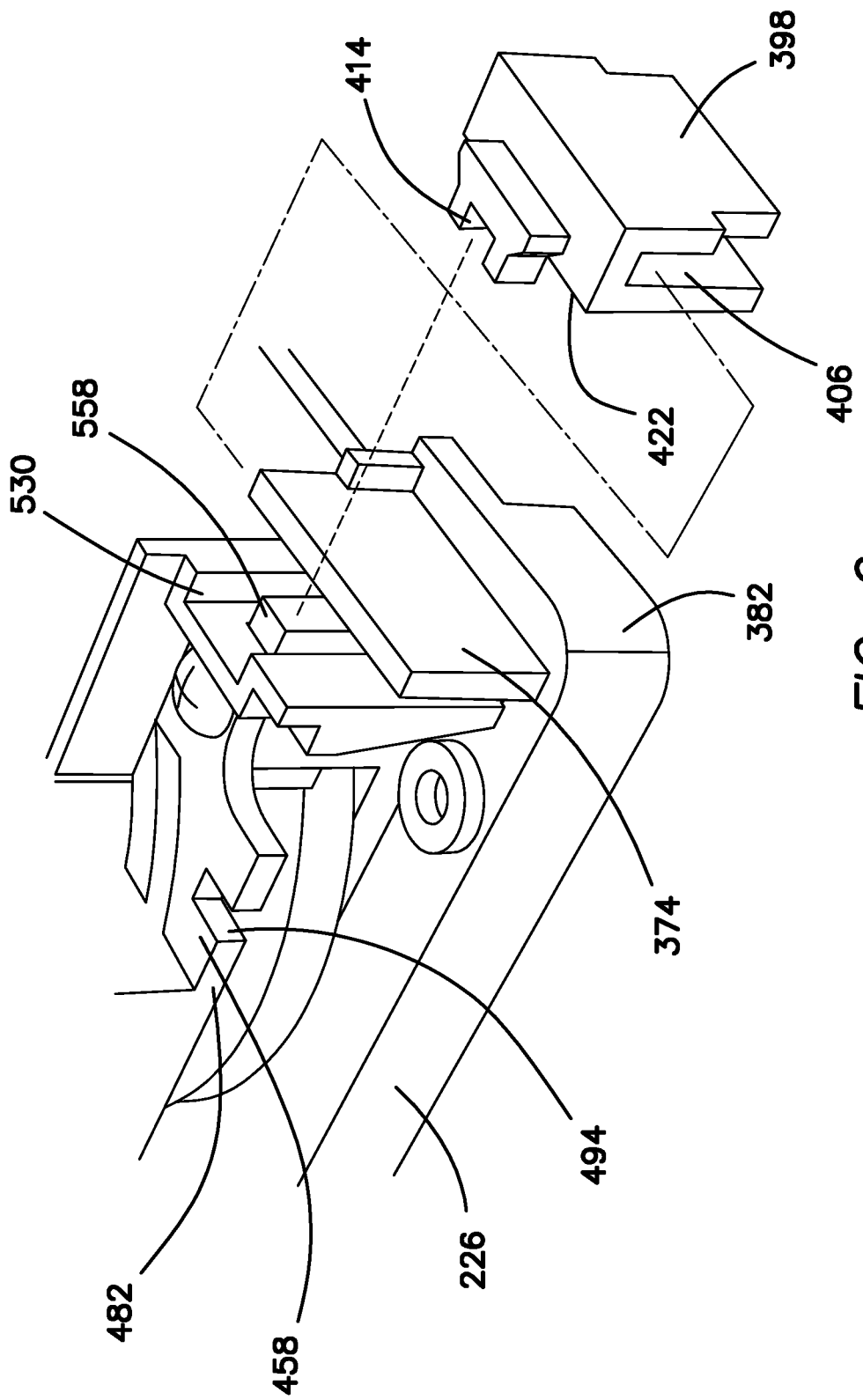
FIG. 9 is an enlarged partial exploded perspective view of a corner of the base illustrating a side retaining cover, an attaching claw, a vertical guide tab and a guide block and their assembly.

(5) In yet another variant, as illustrated in FIGS. 3 and 6, the bug gun rail attaching portion 18 further includes at least one first side gripping ledge 178. The at least one first side gripping ledge 178 extends inwardly from an inner side 182 of the first attaching claw 54. At least one second side gripping ledge 186 is provided. The at least one second side gripping ledge 186 extends inwardly from an inner side 190 of the second attaching claw 58. First 194 and second 198 guide pins are provided. The first 194 and second 198 guide pins extend vertically from the first 54 and second 58 attaching claws. First 202 and second 206 blocking ledges are provided. The first 202 and second 206 blocking ledges extend outwardly from outer sides 210, 214 of the first 54 and second 58 attaching claws. As illustrated in FIGS. 4, 7, 8 and 10, first 218 and second 222 attaching claw slots are provided. The first 218 and second 222 attaching claw slots are located adjacent first 226 and second 230 side edges of the base 46 and are sized and shaped to permit upward movement of the first 54 and second 58 attaching claws as far as the first 202 and second 206 blocking ledges.

A raised central bearing ring 234 is provided. The raised central bearing ring 234 is located on an upper surface 238 of the base 46. The rotating portion 78 of the positioning cam lock 62 has a guide wheel 242 located at a lower end 248. The guide wheel 242 has a circular recess 246 located on an underside 250 of the guide wheel 242. The circular recess 246 is sized and shaped to fit slidably over the raised central bearing ring 234. The guide wheel 242 is penetrated by first 254 and second 258 curved slots. The curved slots 254, 258 are sized and shaped to engage the first 194 and second 198 guide pins. The engagement causes the first 54 and second 58 attaching claws to move laterally as the rotating portion 78 is rotated. The guide wheel 242 has first 262 and second 266 elevating ridges. The first 262 and second 266 elevating ridges are located along an outer perimeter 270 of the guide wheel 242 adjacent the first 254 and second 258 curved slots.

A sighting cylinder 274 is provided. The sighting cylinder 274 is located upon an upper surface 278 of the guide wheel 242 and has a closed upper end 282. A circular bearing ring 286 is located upon the closed upper end 282. The extended vertical shaft 86 extends above circular bearing ring 286. The sighting cylinder 274 has anterior 290 and posterior 294 aligned openings. The anterior 290 and posterior 294 aligned openings permit use of sights 24, 28 of the bug killing gun 74 through the sighting cylinder 274 when the extended vertical shaft 96 is rotated to a locking position 302. The cover 50 has a circular bearing surface 306. The circular bearing surface 306 protrudes below the central aperture 94 and slidably engages the circular bearing ring 286 of the rotating portion 78 of the positioning cam lock 62. The cover 50 has anterior 310 and posterior 314 sighting openings located in anterior 318 and posterior 322 ends of the cover 50. The anterior 310 and posterior 314 sighting openings are aligned with the anterior 290 and posterior 294 aligned openings in the sighting cylinder 274 when the extended vertical shaft 86 is rotated to a locking position 302.

The cover 50 has a countersunk circular bearing surface 330 on the upper surface 106 of the cover 50. A cam activating block 334 is provided. The cam activating block 334 has a protruding circular ring 338 located upon a lower surface 342. The protruding circular ring 338 rotatably engages the countersunk circular bearing surface 330. An enlarged clearance hole 346 extends through the protruding circular ring 338 and a V-shaped notch (not shown) 350 is located above the enlarged clearance hole 346. The V-shaped notch 350 provides a pivoting surface 354 for a bearing pin 358. The bearing pin 358 pivotally mounts the rotary cam 90 of the locking portion 82 of the positioning cam lock 62 to a point 362 adjacent an upper end 366 of the extended vertical shaft 86 of the rotating portion 78.

(6) In a final variant, as illustrated in FIGS. 4, 5, 5A and 9, first 370 and second 374 first side vertical guide tabs are provided. The first 370 and second 374 first side vertical guide tabs are located adjacent front 378 and rear 382 ends of the first side edge 226 of the base 46. First 386 and second 390 second side vertical guide tabs are provided. The first 386 and second 390 second side vertical guide tabs are located adjacent front 380 and rear 384 ends of the second side edge 230 of the base 46.

First 394 and second 398 first side vertical guide blocks are provided. The first 394 and second 398 first side vertical guide blocks have an inner horizontal channel 402, 406, are sized and shaped to fit slidably over the first 370 and second 374 first side vertical guide tabs, and have a vertical guide rail 410, 414 located on an inner surface 418, 422. First 426 and second 430 second side vertical guide blocks are provided. The first 426 and second 430 second side vertical guide blocks have an inner horizontal channel 434, 438, are sized and shaped to fit slidably over the first 386 and second 390 second side vertical guide tabs, and have a vertical guide rail (not shown), 446 located on an inner surface 450, 454.

First 458 and second 462 side retaining covers are provided. The first 458 and second 462 side retaining covers have first 466 and second 470 central curved interior ledges. The first 466 and second 470 central curved interior ledges are sized and shaped to engage the first 262 and second 266 elevating ridges of the guide wheel 242. The first 458 and second 462 side retaining covers are attached to upper edges 474, 478 of the first 54 and second 58 attaching claws, thereby causing the first 54 and second 58 attaching claws to move vertically as the extended vertical shaft 86, sighting cylinder 274 and guide wheel 242 are moved vertically.

The first 458 and second 462 side retaining covers have first 482 and second 486 guide posts, first 490 and second 494 first side guide slots and first (not shown) and second 502 second side guide slots. The cover 50 has first (not shown) and second (not shown) first side guide rails and first 514 and second 518 second side guide rails. The first 482 and second 486 guide posts are sized and shaped to fit slidably between the first and second first side guide rails and first 514 and second 518 second side guide rails, respectively. The first 490 and second 494 first side guide slots and first 498 and second 502 second side guide slots are sized and shaped to fit slidably about the first and second first side guide rails and first 514 and second 518 second side guide rails, respectively.

The first 458 and second 462 side retaining covers have anterior 522, 526 (not shown) and posterior 530, 534 guide notches located at anterior 538, 542 and posterior 546, 550 guide ends of the first 458 and second 462 side retaining covers. The anterior and posterior 530 guide notches of the first side retaining cover 458 are sized and shaped to engage the vertical guide rails 410, 414 of the first 394 and second 398 first side vertical guide blocks. The vertical guide rails 410, 414 of the first 394 and second 398 first side vertical guide blocks are sized and shaped to engage anterior 554 and posterior 558 ends of the first side attaching claw 54. The anterior and posterior 534 guide notches of the second side retaining cover 462 are sized and shaped to engage the vertical guide rails (not shown), 446 of the first 426 and second 430 second side vertical guide blocks. The vertical guide rails (not shown), 446 of the first 426 and second 430 second side vertical guide blocks are sized and shaped to engage anterior 562 and posterior 568 ends of the second side attaching claw 58.

When the bug gun rail attaching portion 18 is positioned on the bug gun top rail 70 and the rotating portion 78 of the positioning cam lock 62 is rotated with the lever 88, the first 54 and second 58 attaching jaws will move laterally to fit beneath an underside 102 of the bug gun top rail 70. When the rotary cam 90 is activated with the lever 88, the rotary cam 90 will be biased against the cam activating block 334, drawing the extended vertical shaft 86, the sighting cylinder 274 and the guide wheel 242 upwardly, biasing the first and second elevating ridges 262, 266 against the first 466 and second 470 central curved interior ledges of the first 458 and second 462 side retaining covers, the first 458 and second 462 side retaining covers drawing the first 54 and second 58 attaching claws upwardly to clamp the bug gun rail attaching portion 18 to the bug gun top rail 70.

The invention claimed is:

1. A cell phone mount for bug killing guns, comprising:
a cell phone clamping portion and a bug gun rail attaching portion;
said cell phone clamping portion being mounted to said bug gun rail attaching portion;
said cell phone clamping portion having first and second retaining jaws, said first and second retaining jaws being sized and shaped to hold first and second side edges of a cell phone and being urged together to provide a first clamping action;
said bug gun rail attaching portion having a base, a cover, first and second attaching claws and a positioning cam lock;
said first and second attaching claws being movable laterally and vertically from said base to provide a second clamping action, said second clamping action attaching said base to a top rail of a bug killing gun;
said bug gun rail attaching portion providing a sighting opening, said sighting opening being disposed above said top rail and allowing continued use of the sights of said bug killing gun;
said positioning cam lock having a rotating portion and a locking portion;
said rotating portion having an extended vertical shaft, being rotatably mounted to said base and engaging said first and second attaching claws to move them laterally and vertically;
said locking portion comprising a lever with attached rotary cam;
said cover having a central aperture and being attached over said rotating portion of said positioning cam lock with said extended vertical shaft extending through said central aperture;
said rotary cam being pivotally mounted to said extended vertical shaft and bearing on said cover adjacent said central aperture;
wherein, when said lever is rotated, said first and second attaching claws will move laterally with respect to said base and when said lever is moved vertically, said rotary cam will move said first and second attaching claws vertically; and
said rotary cam securing said first and second attaching claws in a fixed position by urging said first and second attaching claws upwardly against an underside of said top rail and bearing downwardly on an upper surface of said cover, thereby attaching said cell phone mount to said bug killing gun.

2. The cell phone mount for bug killing guns, as described in claim 1, wherein said cell phone clamping portion further comprises:
at least one compression spring, at least one spring retaining channel, a clamping portion bottom, said clamping portion bottom having at least one spring compressing block and at least one spring compression channel and a clamping portion cover;
said at least one compression spring being sized and shaped to fit within said at least one spring retaining channel;
said at least one spring retaining channel being orthogonally attached to said first retaining jaw;
said at least one spring compressing block being sized and shaped to fit slidably within said at least one spring retaining channel and to bear against an upper end of said at least one compression spring;
said at least one spring retaining channel being sized and shaped to fit slidably within said at least one spring compression channel;
said clamping portion cover being orthogonally attached to said second retaining jaw and being removably attached to said clamping portion bottom, thereby securing said at least one compression spring within said at least one spring retaining channel, and said at least one spring retaining channel within said at least one spring compression channel; and
wherein, when said first retaining jaw is pulled away from said second retaining jaw, a space is created for entry of said cell phone and when said first retaining jaw is released, said first retaining jaw said second retaining jaw will clamp said cell phone.

3. The cell phone mount for bug killing guns, as described in claim 1, wherein said cell phone clamping portion further comprises:

first and second friction pads, said first and second friction pads being attached to inner gripping surfaces of said first and second retaining jaws; and said first and second friction pads having textured outer surfaces and first and second retaining ridges.

4. The cell phone mount for bug killing guns, as described in claim 1, wherein said cell phone clamping portion attaches to said cover of said bug gun rail attaching portion at a downward angle.

5. The cell phone mount for bug killing guns, as described in claim 1, wherein said bug gun rail attaching portion further comprises:

at least one first side gripping ledge, said at least one first side gripping ledge extending inwardly from an inner side of said first attaching claw;

at least one second side gripping ledge, said at least one second side gripping ledge extending inwardly from an inner side of said second attaching claw;

first and second guide pins, said first and second guide pins extending vertically from said first and second attaching claws;

first and second blocking ledges, said first and second blocking ledges extending outwardly from outer sides of said first and second attaching claws;

first and second attaching claw slots, said first and second attaching claw slots disposed adjacent first and second side edges of said base and being sized and shaped to permit upward movement of said first and second attaching claws as far as said first and second blocking ledges;

a raised central bearing ring, said raised central bearing ring disposed on an upper surface of said base;

said rotating portion of said positioning cam lock having a guide wheel disposed at a lower end, said guide wheel having a circular recess disposed on an underside of said guide wheel, said circular recess being sized and shaped to fit slidably over said raised central bearing ring;

said guide wheel being penetrated by first and second curved slots, said curved slots being sized and shaped to engage said first and second guide pins, said engagement causing said first and second attaching claws to move laterally as said rotating portion is rotated;

said guide wheel having first and second elevating ridges, said first and second elevating ridges disposed along an outer perimeter of said guide wheel adjacent said first and second curved slots;

a sighting cylinder, said sighting cylinder disposed upon an upper surface of said guide wheel and having a closed upper end, a circular bearing ring disposed upon said closed upper end, said extended vertical shaft extending above said circular bearing ring;

said sighting cylinder having anterior and posterior aligned openings, said anterior and posterior aligned openings permitting use of sights of said bug killing gun through said sighting cylinder when said extended vertical shaft is rotated to a locking position;

said cover having a circular bearing surface, said circular bearing surface protruding below said central aperture and slidably engaging said circular bearing ring of said_rotating portion of said positioning cam lock;

said cover having anterior and posterior sighting openings disposed in anterior and posterior ends of said cover, said anterior and posterior sighting openings being aligned with said anterior and posterior aligned openings in said sighting cylinder when said extended vertical shaft is rotated to a locking position;

said cover having a countersunk circular bearing surface on said upper surface of said cover; and a cam activating block, said cam activating block having a protruding circular ring disposed upon a lower surface, said protruding circular ring rotatably engaging said countersunk circular bearing surface, an enlarged clearance hole extending through said protruding circular ring and a V-shaped notch disposed above said enlarged clearance hole, said V-shaped notch providing a pivoting surface for a bearing pin, said bearing pin pivotally mounting said rotary cam of said locking portion of said positioning cam lock to a point adjacent an upper end of said extended vertical shaft of said rotating portion.

6. The cell phone mount for bug killing guns, as described in claim 5, further comprising:

first and second first side vertical guide tabs; said first and second first side vertical guide tabs disposed adjacent front and rear ends of said first side edge of said base;

first and second second side vertical guide tabs; said first and second second side vertical guide tabs disposed adjacent front and rear ends of said second side edge of said base;

first and second first side vertical guide blocks; said first and second first side vertical guide blocks having an inner horizontal channel, being sized and shaped to fit slidably over said first and second first side vertical guide tabs, and having a vertical guide rail disposed on an inner surface;

first and second second side vertical guide blocks; said first and second second side vertical guide blocks having an inner horizontal channel, being sized and shaped to fit slidably over said first and second second side vertical guide tabs, and having a vertical guide rail disposed on an inner surface;

first and second side retaining covers, said first and second side retaining covers having first and second central curved interior ledges, said first and second central curved interior ledges being sized and shaped to engage said first and second elevating ridges of said guide wheel;

said first and second side retaining covers being attached to upper edges of said first and second attaching claws, thereby causing said first and second attaching claws to move vertically as said extended vertical shaft, sighting cylinder and guide wheel are moved vertically;

said first and second side retaining covers having first and second guide posts, first and second first side guide slots and first and second second side guide slots;

said cover having first and second first side guide rails and first and second second side guide rails, said first and second guide posts being sized and shaped to fit slidably between said first and second first side guide rails and first and second second side guide rails, respectively, said first and second first side guide slots and first and second second side guide slots being sized and shaped to fit slidably about said first and second first side guide rails and first and second second side guide rails, respectively;

said first and second side retaining covers having anterior and posterior guide notches disposed at anterior and posterior guide ends of said first and second side retaining covers;

said anterior and posterior guide notches of said first side retaining cover being sized and shaped to engage said vertical guide rails of said first and second first side vertical guide blocks, said vertical guide rails of said first and second first side vertical guide blocks being sized and shaped to engage anterior and posterior ends of said first side attaching claw;

said anterior and posterior guide notches of said second side retaining cover being sized and shaped to engage said vertical guide rails of said first and second second side vertical guide blocks, said vertical guide rails of said first and second second side vertical guide blocks being sized and shaped to engage anterior and posterior ends of said second side attaching claw; and wherein, when said bug gun rail attaching portion is positioned on said bug gun top rail and said rotating portion of said positioning cam lock is rotated with said lever, said first and second attaching jaws will move laterally to fit beneath an underside of said bug gun top rail and when said rotary cam is activated with said lever, said rotary cam will be biased against said cam activating block drawing said extended vertical shaft, said sighting cylinder and said guide wheel upwardly, biasing said first and second elevating ridges against said first and second central curved interior ledges of said first and second side retaining covers, said first and second side retaining covers drawing said_first and second attaching claws upwardly to clamp said bug gun rail attaching portion to said bug gun top rail.

* * * * *